3,164,635
PROCESS FOR PREPARING ACYCLIC
HYDRAZINIUM SALTS
George L. Braude, Linthicum, Md., assignor to W. R. Grace & Co., New York, N.Y., a corporation of Connecticut
No Drawing. Filed Nov. 6, 1961, Ser. No. 150,205
8 Claims. (Cl. 260—583)

This invention relates to quaternary nitrogenous salts. More particularly, it relates to an improved process for making quaternized derivatives of substituted hydrazines, specifically acyclic fatty hydrazinium chlorides.

Heretofore, quaternary hydrazinium salts have been obtained only on a laboratory scale. They have usually been prepared by the reaction of 1,1-disubstituted hydrazine with alkylating agents such as methyl chloride. Because of the extreme difficulties involved in preparing the parent hydrazines and the limitations of the final alkylation (see O. Westphal, Berichte der Deutchen Chemischen Gesellschaft, vol. 74, page 759 et. seq., and pages 1365 et seq., 1941) the uses of hydrazinium chlorides have not been completely explored. Their various uses include commercial application as bacteriocides, detergents, polymerization initiators, antihistaminics, antispasmodics, and as intermediates for preparing a wide range of chemicals.

It has recently been discovered that chloramine will react with tertiary amines to form tri-substituted hydrazinium chlorides (Omietanski U.S. Patent 2,955,108). This new reaction presents practically limitless possibilities for the preparation of novel and interesting chemical compounds which, because of their structure and inherent physical properties, have a wide range of uses. Tertiary amines are readily available bases. Chloramine is an excellent reagent since it can be economically obtained in commercial quantities by using the well-known process of Sisler et al. (described in U.S. Patent 2,710,248) where chlorine and ammonia are reacted in the vapor phase to produce chloramine (monochloramine).

U.S. Patent 2,929,847 discloses the use of the tertiary amine-chloramine reaction to prepare a specific class of hydrazinium chlorides having the general formula:

(I)
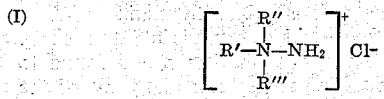

where R' is an aliphatic hydrocarbon residue having from 16–24 carbon atoms and preferably is an alkyl, alkenyl, or alkadienyl radical having from 16 to 24 carbon atoms and wherein R'' and R''' are members selected from the group consisting of alkyl radicals having 1 to 24 carbon atoms, alkenyl radicals having from 2 to 24 carbon atoms, and alkadienyl radicals having from 4 to 24 carbon atoms. These compounds are shown to have excellent and completely unexpected utility as softening agents in the textile industry.

The compounds shown in Rudner U.S. Patent 2,929,847 can be prepared by one of two methods. In the first method pre-formed chloramine ($NH_2Cl$) is contacted with a solution of the selected tertiary amine, the reaction is permitted to proceed until the desired quantity of chloramine is consumed and the resultant hydrazinium chloride is separated and purified. Rudner discloses that while chloramine is most advantageously prepared in the form of a gaseous chloramine-ammonia-nitrogen stream obtained from a generator constructed according to the teachings of Sisler et al., other methods are equally adaptable. For instance, chloramine can be made by reacting chlorine with an excess of ammonia in a halogenated hydrocarbon solvent under controlled conditions of mixing at low temperatures. Such a procedure is fully described in U.S. Patent No. 2,678,258 to John F. Haller. Another effective procedure is that of Coleman et al., fully described in Inorganic Syntheses, vol. I, page 59, 1939. A second method of preparing the compounds described in the Rudner patent is fully described in an application of Rudner, Serial No. 605,230 (filed August 20, 1956, mentioned in the Rudner patent and now abandoned) which teaches the direct reaction of chlorine, ammonia and tertiary amine in the presence of excess ammonia. This direct reaction will hereinafter be referred to as the "one-step" method. In both of the methods described above for preparing the new compounds shown in U.S. Patent 2,929,847 there is generally a serious problem in recovering the hydrazinium chloride free from ammonium chloride which is produced as a by-product of the reaction. As shown by the examples in the Rudner patent, complicated and cumbersome techniques are necessary for obtaining the desired separation of the two reaction products. Furthermore, the separated solutions or dispersions of hydrazinium chloride recovered in Rudner's process have very short storage life and hence further processing is ordinarily necessary for putting the hydrazinium salts into a form suitable for use in their intended application.

It is an object of this invention to provide a process for preparing hydrazinium chlorides of the formula:

(II)
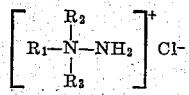

$R_1$ is an aliphatic hydrocarbon radical containing from 8 to 20 carbon atoms, inclusive, and preferably is an alkyl, alkenyl or alkadienyl radical containing from 16 to 20 carbon atoms, inclusive; and $R_2$ and $R_3$ are aliphatic hydrocarbon radicals containing from 1 to 20 carbon atoms, inclusive, preferably alkyl radicals containing from 1 to 20 carbon atoms, alkenyl radicals containing from 2 to 20 carbon atoms or alkadienyl radicals containing from 4 to 20 carbon atoms; by chloramination of tertiary amines wherein a rapid and substantially complete separation of ammonium chloride can be made. It is another object of this invention to provide a process for the preparation of hydrazinium chlorides having the general Formula II, above, by a chloramination of tertiary amines wherein a rapid and substantially complete separation of ammonium chloride can be made and where the hydrazinium chloride is simultaneously recovered in a storage-stable form useful as a textile softener without any further processing. Further objects of this invention will be obvious to those skilled in the art in view of the more detailed description which follows.

In accordance with the present invention, a tertiary amine of the formula:

(III)

where $R_1$, $R_2$ and $R_3$ are the same as previously defined, is reacted with chloramine in a reaction medium consisting of a lower alkanol for a time sufficient to substantially completely convert the amine to the corresponding hydrazinium chloride, the reaction product mass is agitated, sufficient amounts of water are added to the agitated reaction product mass to dissolve the ammonium chloride content thereof, the water alcohol mixture is permitted to form into two liquid phases and the two phases separated.

Suitable conditions for the chloramination of the tertiary amine starting material by the so-called "two step"

process are fully described in, e.g., Omietanski's U.S. Patent 2,955,108 and Rudner's U.S. Patent 2,929,847 above cited. The "one step" process, wherein chloramine is generated in situ is fully described in Rudner's U.S. application, Serial No. 605,230 also cited above. Since these teachings are readily available, no further discussion of reaction temperature, time, pressures, reactant ratios, etc. need be repeated herein. Instead it will be deemed that the disclosures of the above cited patents and application are incorporated herein by reference thereto.

In the process of this invention, the reaction medium used in conducting the reactions taught by the above prior art must be a lower alkanol. The term "lower alkanol" is used herein to mean a monohydric saturated aliphatic alcohol containing from 1 to about 4 carbon atoms. Such alkanols are conveniently represented by the formula $R_4OH$ where $R_4$ is a straight or branched chain alkyl group containing from 1 to 4 carbon atoms. Specific lower alkanols suitable for the process of this invention are methyl alcohol, ethyl alcohol, normal propyl alcohol, isopropyl alcohol, normal butyl alcohol, isobutyl alcohol, or secondary butyl alcohol and mixtures thereof. For best reaction efficiency and economy, and for optimum ease in recovery, the medium used should be isopropanol.

Examples of tertiary amines included within the scope of Formula III above which are suitable for use in the process of this invention are shown by Rudner, U.S. Patent 2,929,847, e.g., at col. 2, lines 1 to 45. Other suitable amines are dimethyldecyl, dimethylundecenyl, butyldidodecyl, tris-dodecyl, dimethylhexadecyl, methylbutylhexadecyl, dibutylhexadecenyl, dimethyloctadecenyl, methyldioctadecenyl, methyldioctadecadienyl, dimethyleicosanyl, di-n-propyloctadecyl, di-n-heptylhexadecyl, or any other like tertiary amine.

The reaction of chloramine with the selected tertiary amine is continued until substantially all (about 95% or more) of the amine is converted to the corresponding hydrazinium chloride. With the particular reaction medium used in my improved process, all tertiary amines within the scope of general Formula II above are easily and rapidly substantially completely reacted to form hydrazinium chloride. Thus no difficulty is encountered in meeting this requirement of my improved process.

The lower alkanol medium used in my improved process dissolves all or a major portion (80 percent by weight or more) of the tertiary amine reactant as well as the hydrazinium chloride produced. The reaction product liquid therefore comprises a solution of hydrazinium chloride and minor amounts of unreacted amine, and may contain small amounts of suspended hydrazinium chloride solids. Ammonium chloride by-product appears as a settled precipitate in the product liquor.

In prior processes the ammonium chloride precipitate was separated by filtering, and the recovered ammonium chloride was dried to recover occluded solvent. This involves obvious problems in obtaining good filtration and in handling the separated solid ammonium chloride. The process of this invention eliminates these costly and time consuming filtration and solids handling steps.

In accordance with the invention, water is added to the reaction product mass in an amount at least sufficient to dissolve substantially all of the ammonium chloride. The specific amount of water that must be added thus depends upon the amount of ammonium chloride by-product. The reaction product mass is agitated (preferably by stirring) as the water is added to assure intimate admixture of the water therein.

After water has been added in the requisite amounts, the mixture is permitted to remain quiescent until two separate and distinct phases are formed. The lower phase consists of an aqueous solution of ammonium chloride. The added water will usually dissolve some lower alkanol, so that the upper layer generally consists of an aqueous-alcoholic solution of hydrazinium chloride, sometimes containing small portions of dispersed hydrazinium chloride. The hydrazinium chloride solution contains essentially no ammonium chloride. The hydrazinium chloride solution recovered is directly suitable for use as a textile softener, no further concentration or purification being required. When cooled and/or stored under ordinary conditions, the hydrazinium product sometimes forms into a creamy paste. This product nevertheless is storage stable for long periods of time (several months or more). This is in sharp contrast with the products of the prior processes which, unless specially processed, often settle into hard solid cakes after only several weeks of storage.

The invention will be further illustrated by the following non-limiting specific examples.

*Example 1*

A chloramine generator was constructed as described in Sisler et al. U.S. Patent 2,710,248, and a stream of chloramine mixed with ammonia and nitrogen was prepared by feeding to the generator 0.3 mole per minute of ammonia, 0.016 mole per minute of chlorine and 0.015 mole per minute of nitrogen in the manner described in the Sisler et al. patent. A glass wool filter was used to remove ammonium chloride from the chloramine gas stream. Analysis of the filtered gas stream by iodometric titration showed that chloramine was being produced and recovered at a rate of about 0.1 mole per minute.

A four-liter resin kettle equipped with a stirrer, reflux condenser and a gas inlet tube was charged with 900 milliliters of technical grade (99% pure) isopropyl alcohol and 300 grams (about 0.53 mole) of a commercially available amine known as "Armeen $M_2HT$." This amine is about 86% $(R_a)_2NCH_3$ and 6% $(R_a)_3N$, where $R_a$ is a hydrocarbon chain derived from hydrogenated tallow fatty acids and contains approximately 70% octadecyl residues and 30% hexadecyl residues. The kettle contents were warmed by means of a heating mantle to about 40 to 50° centigrade at which temperatures all the amine was dissolved in the alcohol.

The chloramine-ammonia-nitrogen gas stream described above was then introduced into the amine solution until 200% of the amount theoretically required had been absorbed. Total chlorine consumption was 104.5 grams.

The chloraminated reaction mixture was evaporated to ½ its initial volume and an equal volume of warm (about 70° centigrade) water was added, with mixing. When permitted to settle, the liquid separated into two sharp layers. The bottom layer was withdrawn and found to be an aqueous solution containing essentially all of the ammonium chloride by-product of the chloramination reaction. The upper layer was an aqueous-alcoholic solution of 1,1-bis-"hydrotallow"-1-methylhydrazinium chloride (consisting chiefly of 1-methyl-1, 1-dioctadecylhdrazinium chloride) containing essentially no ammonium chloride. This hydrazinium chloride product was useful as a textile softener without any need for further purification or other treatment.

*Example 2*

A solution of 300 grams Armeen $M_2HT$ (described in Example 1 above) in 900 grams of technical grade isopropyl alcohol was reacted directly with a stream of chlorine gas surrounded by a concentric stream of gaseous ammonia in accordance with the "one-step" chloramination methods described in Rudner, U.S. application Serial Number 605,230, mentioned above. The reaction was conducted at temperatures between about 60° and 70° centigrade and was continued until 112 grams of chlorine (300% of the theoretical amount) had been introduced to the reaction vessel. Isopropyl alcohol was added periodically during the course of the run to make up for losses due to evaporation.

A fine stream of water was added to the reaction product mixture until clear separation into two layers had occurred after periodic mixing and settling. The lower layer, containing all of the ammonium chloride by-product of the reaction was withdrawn. The supernatent layer contained all of the hydrazinium chloride product, dissolved in a mixture of alcohol and water. On cooling, a white creamy paste formed, which showed no separation, crystallization, or sedimentation even after 3 or 4 months storage at ambient temperatures. Moreover, this paste was in a very desirable form for handling in textile plants and was directly suitable for use as a textile softener without any further treatment.

The process of this invention is suitable for the preparation of hydrazinium chlorides from any tertiary amine having the formula:

where $R_1$, $R_2$ and $R_3$ are defined hereinabove. The removal of ammonium chloride by-product in accordance with the process of this invention is much more economical than the methods previously known, since it eliminates the cumbersome and expensive centrifuging or filtering steps and the expensive solid handling steps previously needed. In addition, the final product of the process of this invention consists of an aqueous lower alkanol solution or dispersion of the desired hydrazinium chloride which is directly usable as a textile softener without further concentration or crystallization. Furthermore, these products are storage stable for relatively very long periods of time.

What is claimed is:

1. In the process for preparing hydrazinium chlorides of the formula

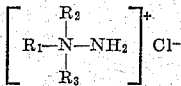

wherein $R_1$ is an aliphatic hydrocarbon residue having from 8 to 20 carbon atoms and selected from the group consisting of alkyl, alkenyl, and alkadienyl radicals, and $R_2$ and $R_3$ are members selected from the group consisting of alkyl radicals having from 1 to 20 carbon atoms, alkenyl radicals having from 2 to 20 carbon atoms, and alkadienyl radicals having from 4 to 20 carbon atoms, by reacting chloramine with a tertiary amine of the formula

wherein $R_1$, $R_2$ and $R_3$ are defined above, conducting said reaction in a reaction medium consisting of a lower alkanol, the improvement which comprises agitating the reaction product liquor while adding sufficient amounts of water thereto to dissolve the ammonium chloride contained therein, ceasing agitation and maintaining the mixture thereby produced quiescent until two liquid phases are formed, and separating the two phases.

2. Process as defined in claim 1 wherein said lower alkanol is a member of the group consisting of methanol, ethanol, n-propanol, isopropanol, n-butanol, isobutanol, sec-butanol and mixtures thereof.

3. Process as defined in claim 1 wherein said lower alkanol is isopropanol.

4. Process as defined in claim 2 wherein said tertiary amine is methyldioctadecyl amine.

5. Process for separating ammonium chloride from a mixture containing a lower alkanol, ammonium chloride and a hydrazinium chloride of the formula

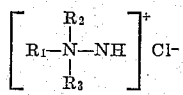

wherein $R_1$ is an aliphatic hydrocarbon radical containing from 8 to 20 carbon atoms and selected from the group consisting of alkyl, alkenyl, and alkadienyl radicals, and $R_2$ and $R_3$ are members of the group consisting of alkyl radicals containing from 1 to 20 carbon atoms, alkenyl radicals containing from 2 to 20 carbon atoms and alkadienyl radicals containing from 4 to 20 carbon atoms; which comprises agitating said mixture, adding water to said agitated mixture in an amount sufficient to dissolve substantially all of the ammonium chloride, discontinuing said agitation, maintaining the water-alkanol mixture thereby produced quiescent until two liquid phases are formed, and separating the ammonium chloride-containing aqueous phase.

6. Process as defined in claim 5 wherein said lower alkanol is a member of the group consisting of methanol, ethanol, n-propanol, isopropanol, n-butanol, isobutanol, sec.-butanol and mixtures thereof.

7. Process as defined in claim 5 wherein said lower alkanol is isopropanol.

8. Process as defined in claim 5 wherein said lower alkanol is ethanol.

No references cited.

CHARLES B. PARKER, *Primary Examiner.*

L. ZITVER, *Examiner.*